United States Patent
Cherian et al.

(10) Patent No.: US 9,652,408 B2
(45) Date of Patent: *May 16, 2017

(54) SYSTEM AND METHOD FOR PROVIDING DATA INTEGRITY

(71) Applicants: Jacob Cherian, Austin, TX (US); Kevin Marks, Georgetown, TX (US)

(72) Inventors: Jacob Cherian, Austin, TX (US); Kevin Marks, Georgetown, TX (US)

(73) Assignee: Dell Products L.P., Round Rock, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/444,819

(22) Filed: Jul. 28, 2014

(65) Prior Publication Data

US 2014/0337641 A1    Nov. 13, 2014

Related U.S. Application Data

(63) Continuation of application No. 12/277,792, filed on Nov. 25, 2008, now Pat. No. 8,819,450.

(51) Int. Cl.

| | |
|---|---|
| *G06F 21/00* | (2013.01) |
| *G06F 12/14* | (2006.01) |
| *G06F 21/64* | (2013.01) |
| *H04L 9/08* | (2006.01) |

(52) U.S. Cl.
CPC .......... *G06F 12/1408* (2013.01); *G06F 21/64* (2013.01); *H04L 9/0891* (2013.01); *G06F 2212/1052* (2013.01)

(58) Field of Classification Search
CPC ................. G06F 21/64; G06F 12/1408; G06F 2212/1052; H04L 9/0891
See application file for complete search history.

(56) References Cited

U.S. PATENT DOCUMENTS

| | | | |
|---|---|---|---|
| 4,864,616 A | 9/1989 | Pond et al. | 713/165 |
| 7,565,532 B2 | 7/2009 | Pham et al. | 713/165 |
| 7,853,691 B2 | 12/2010 | Elzur et al. | 709/225 |
| 7,921,463 B2 | 4/2011 | Sood et al. | 726/26 |
| 8,112,602 B2 | 2/2012 | Li et al. | 711/163 |
| 8,131,996 B2 | 3/2012 | Durand | 713/158 |
| 8,347,115 B2* | 1/2013 | Danilak | G06F 21/602 713/189 |
| 8,819,450 B2* | 8/2014 | Cherian et al. | 713/193 |

(Continued)

*Primary Examiner* — Mohammad A Siddiqi
(74) *Attorney, Agent, or Firm* — Baker Botts L.L.P.

(57) ABSTRACT

Systems and methods for providing data integrity for stored data are disclosed. A method may include, in connection with the receipt of a read command at a storage resource, reading a data block from the storage resource, the data block including a data field, a data integrity field indicating the integrity the data field, and an encryption indicator field indicating whether the data block is encrypted with a current cryptographic key for the storage resource. The method may further include determining whether the data field is encrypted with the current cryptographic key based at least on the encryption indicator field. The method may additionally include returning at least a portion of the data block in reply to the read command in response to determining that the data field is encrypted with a cryptographic key other than the current cryptographic key.

10 Claims, 3 Drawing Sheets

(56) References Cited

U.S. PATENT DOCUMENTS

| | | |
|---|---|---|
| 2003/0033537 A1* | 2/2003 | Fujimoto et al. .............. 713/193 |
| 2003/0046593 A1* | 3/2003 | Xie et al. ....................... 713/202 |
| 2003/0076957 A1* | 4/2003 | Asokan .................. G06Q 20/04 |
| | | 380/270 |
| 2006/0133614 A1 | 6/2006 | Zhang et al. .................. 380/273 |
| 2007/0168664 A1 | 7/2007 | Goodman et al. ............. 713/171 |
| 2008/0028235 A1 | 1/2008 | Smith et al. ................... 713/190 |
| 2008/0072071 A1 | 3/2008 | Forehand et al. ............. 713/193 |
| 2008/0320263 A1* | 12/2008 | Nemiroff ............ G06F 21/6209 |
| | | 711/164 |
| 2009/0196421 A1* | 8/2009 | Okuda .................. H04L 9/0637 |
| | | 380/270 |
| 2010/0111308 A1* | 5/2010 | Forsberg ............... H04L 63/061 |
| | | 380/278 |
| 2010/0125915 A1* | 5/2010 | Hall ........................ G06F 21/85 |
| | | 726/26 |
| 2010/0208894 A1* | 8/2010 | True et al. .............. B60R 25/24 |
| | | 380/270 |
| 2011/0145598 A1* | 6/2011 | Smith ................... G06F 21/554 |
| | | 713/190 |

\* cited by examiner

SYSTEM AND METHOD FOR PROVIDING DATA INTEGRITY

CROSS-REFERENCE TO RELATED APPLICATION

The present application is a continuation application of U.S. patent application Ser. No. 12/277,792 filed Nov. 25, 2008, now U.S. Pat. No. 8,819,450 Issued Aug. 26, 2014, which is hereby incorporated by reference in its entirety for all purposes.

TECHNICAL FIELD

The present disclosure relates in general to storage and processing of data, and more particularly to providing data integrity of stored data.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems often use an array of physical storage resources, such as a Redundant Array of Independent Disks (RAID), for example, for storing information. Arrays of physical storage resources typically utilize multiple disks to perform input and output operations and can be structured to provide redundancy which may increase fault tolerance. Other advantages of arrays of storage resources may be increased data integrity, throughput, and/or capacity. In operation, one or more storage resources disposed in an array of storage resources may appear to an operating system as a single logical storage unit or "virtual storage resource." Implementations of storage resource arrays can range from a few storage resources disposed in a server chassis, to hundreds of storage resources disposed in one or more separate storage enclosures.

Increasingly, various mechanisms have been employed in order to ensure the integrity of data read to and written from storage resources, including "end-to-end" data protection from the application to the storage resource. An example of such a mechanism is the T10 protection information model (PIM), which is illustrated in FIG. 1. As shown in FIG. 1, a data block 100 to be written to a storage device may include data 102 and a data integrity field (DIF) 104. DIF 104 may itself include one or more subfields, such as, for example, a data block guard 106, a data block application tag 108, and a data block reference tag 110. Data block guard 106 may include an error-detecting code based at least in part on the value of data 102, e.g., a cyclic redundancy check (CRC). Data block application tag 108 may include metadata indicative of the particular application to which the written data is associated. Data block reference tag 110 may include information associated with a specific data block within some context, for example the least-significant two or four bytes of the logical block address (LBA) of the write command associated with data 102.

When a storage resource receives a read request for data block 100, a controller associated with the storage resource may check data block 102 against the stored DIF 104 to ensure that the data returned as part of the read request is valid (e.g., the data block guard 106 does not indicate corrupted data and that the data is associated with the LBA referenced in the read command). If the DIF 104 indicates an integrity error, a controller associated with the storage resource may return an error message, indicating a data integrity error.

In addition, various encryption techniques have also been used to encrypt data written to storage resources in order to secure data. For example, full disk encryption (FDE) is a technique whereby software, hardware, or a combination thereof encrypts substantially every bit of data written to a physical storage resource. Using FDE, all data written to a storage resource may be encrypted with an encryption key when written to the storage resource and decrypted with the key when read from the storage resource. Any suitable technique known in the art may be used to manage and/or store the encryption key, so as to provide a desired level of data security.

Because an FDE-enabled storage resource encrypts substantially every bit of data stored on thereon, it may be quickly and securely "deleted" or "erased" cryptographically by simply discarding a presently-used encryption key and replacing it with a new key for future data stored on the drive. However, this cryptographic erase operation may create difficulties when used in conjunction with PIM or similar mechanisms for end-to-end data protection. To illustrate, an FDE-enabled storage resource may not distinguish between a data block 102 and its associated DIF 104. Thus, when a data block 102 and its associated DIF 104 are stored on an FDE-enabled storage resource, both the data block 102 and the DIF 104 are encrypted. Accordingly, after a cryptographic erase, the storage resource may return a DIF error message in response to a read request in situations in which data has not been written to the storage resource from the time of the cryptographic erase (e.g., a valid DIF 104 encoded with a first key may not be valid when decrypted with a second key). In many instances, this may not be an issue as one does not often read data from a storage resource to which data has not been previously written.

However, in a storage array environment (e.g., a RAID array), difficulties may arise in connection with the initialization of a virtual storage resource. During such an initialization, I/O operations may take place whereby the redundant nature of a storage array is created and maintained. For example, in an initialization for an array using mirroring, an operation may take place whereby data is read from one physical storage resource and copied to another. As another example, in an initialization for an array using parity-based redundancy, an operation may take place whereby data is read from a plurality of physical storage resources of the array and parity data is written to one or more physical storage resources of the array. Accordingly, during initialization, a read request may occur to a portion of a physical storage resource to which data has not been written from the time of a cryptographic erase of the physical storage resource. Such a read request may therefore generate a DIF error, as the initialization may be unable to determine whether the error is due to a cryptographic erase or due to a bona fide DIF error.

SUMMARY

In accordance with the teachings of the present disclosure, the disadvantages and problems associated with providing data integrity of stored data have been substantially reduced or eliminated.

In accordance with one embodiment of the present disclosure, a method for ensuring data integrity of data in a full-disk encryption storage resource is provided. The method may include, in connection with the receipt of a read command at a storage resource, reading a data block from the storage resource, the data block including a data field, a data integrity field indicating the integrity the data field, and an encryption indicator field indicating whether the data block is encrypted with a current cryptographic key for the storage resource. The method may further include determining whether the data field is encrypted with the current cryptographic key based at least on the encryption indicator field. The method may additionally include returning at least a portion of the data block in reply to the read command in response to determining that the data field is encrypted with a cryptographic key other than the current cryptographic key.

In accordance with another embodiment of the present disclosure, a method for ensuring data integrity of data in a full-disk encryption storage resource is provided. The method may include modifying a value of a register associated with the storage resource in response to receiving an indication that a cryptographic key associated with a storage resource been modified. The method may also include appending the value of the register to at least one data block subsequently written to the storage resource.

In accordance with an additional embodiment of the present disclosure, a storage resource may be provided. The storage resource may be configured to in connection with receiving a read command at the storage resource, read a data block from the storage resource, the data block including a data field, a data integrity field indicating the integrity the data field, and an encryption indicator field indicating whether the data block is encrypted with a current cryptographic key for the storage resource. The storage resource may also be configured to determine whether the data field is encrypted with the current cryptographic key based at least on the encryption indicator field. The storage resource may be further configured to return at least a portion of the data block in reply to the read command in response to determining that the data field is encrypted with a cryptographic key other than the current cryptographic key.

In a further embodiment of the present disclosure, a storage resource may include a register. The storage resource may be configured to in response to receiving an indication that a cryptographic key associated with the storage resource been modified, modify a value of the register associated with the storage resource. The storage resource may also be configured to append the value of the register to at least one data block subsequently written to the storage resource.

Other technical advantages will be apparent to those of ordinary skill in the art in view of the following specification, claims, and drawings.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

Figure 1:
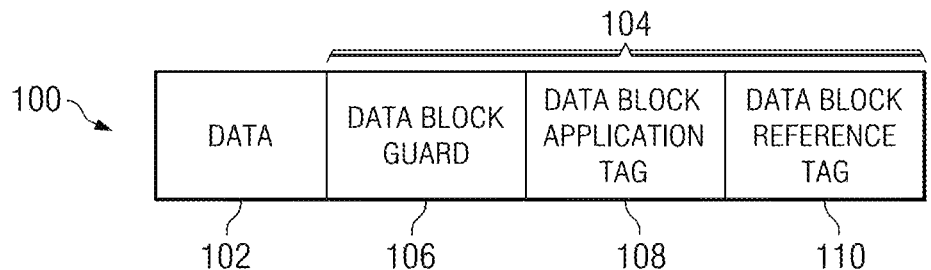
FIG. 1 illustrates a block diagram of an example data block having a data integrity field, as is known in the art.

Preferred embodiments and their advantages are best understood by reference to FIGS. 2-6, wherein like numbers are used to indicate like and corresponding parts.

For the purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a PDA, a consumer electronic device, a network storage device, or any other suitable device and may vary in size, shape, performance, functionality, and price. The information handling system may include memory, one or more processing resources such as a central processing unit (CPU) or hardware or software control logic. Additional components or the information handling system may include one or more storage devices, one or more communications ports for communicating with external devices as well as various input and output (I/O) devices, such as a keyboard, a mouse, and a video display. The information handling system may also include one or more buses operable to transmit communication between the various hardware components.

For the purposes of this disclosure, computer-readable media may include any instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory; as well as communications media such wires, optical fibers, microwaves, radio waves, and other electromagnetic and/or optical carriers; and/or any combination of the foregoing.

An information handling system may include or may be coupled via a network to one or more arrays of storage resources. The array of storage resources may include a plurality of storage resources, and may be operable to perform one or more input and/or output storage operations, and/or may be structured to provide redundancy. In operation, one or more storage resources disposed in an array of storage resources may appear to an operating system as a single logical storage unit or "virtual resource."

In certain embodiments, an array of storage resources may be implemented as a Redundant Array of Independent Disks (also referred to as a Redundant Array of Inexpensive Disks or a RAID). RAID implementations may employ a number of techniques to provide for redundancy, including striping, mirroring, and/or parity checking. As known in the art, RAIDs may be implemented according to numerous RAID standards, including without limitation, RAID 0, RAID 1, RAID 0+1, RAID 3, RAID 4, RAID 5, RAID 6, RAID 01, RAID 03, RAID 10, RAID 30, RAID 50, RAID 51, RAID 53, RAID 60, RAID 100, etc.

Figure 2:
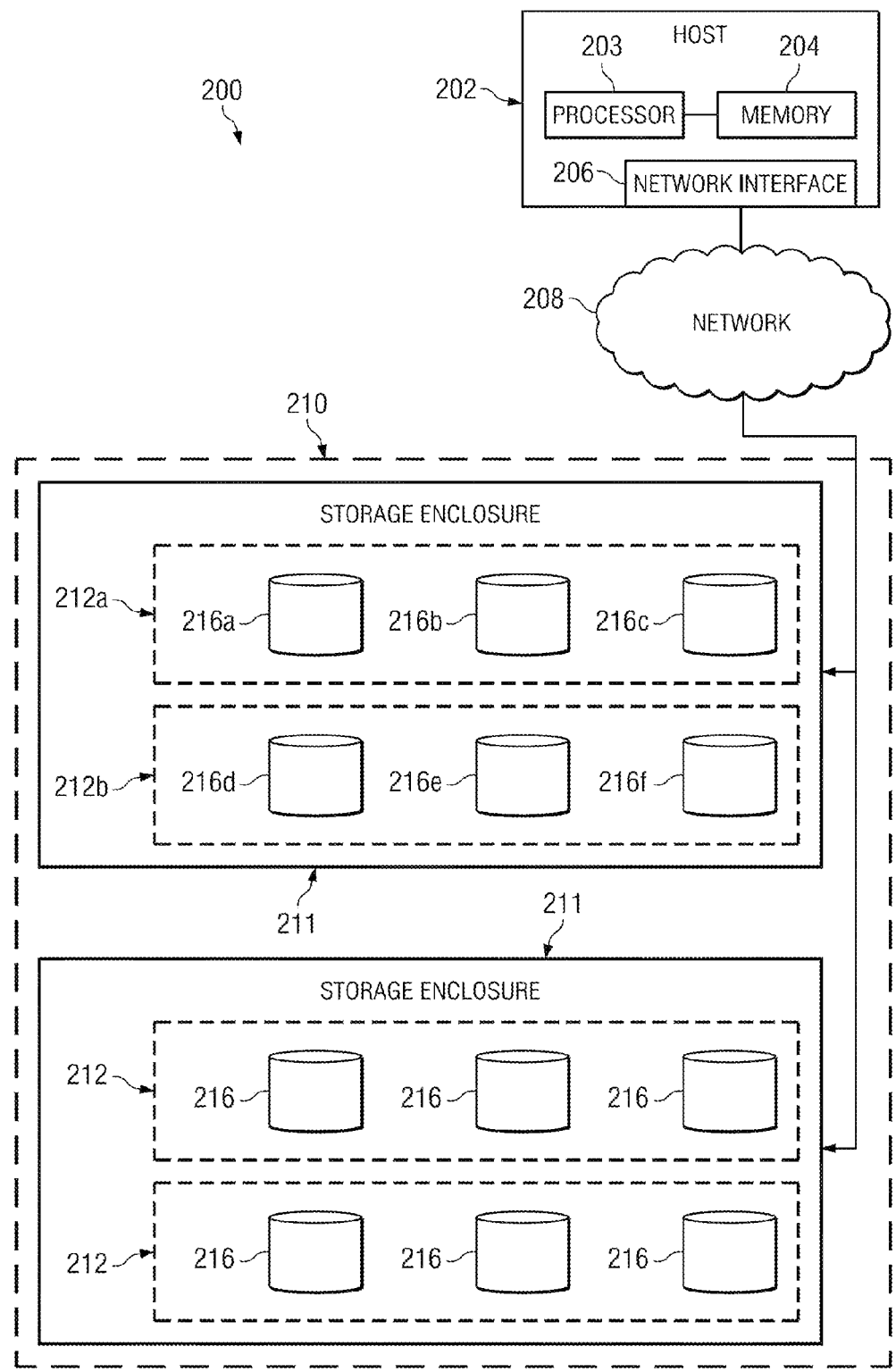
FIG. 2 illustrates a block diagram of an example system for storing data, in accordance with the teachings of the present disclosure.

FIG. 2 illustrates a block diagram of an example system 200 for storing data, in accordance with the teachings of the present disclosure. As depicted, system 200 may include one or more host nodes 202, a network 208, and a storage array 210 comprising one or more storage enclosures 211.

Host 202 may comprise an information handling system and may generally be operable to communicate via network 208 to read data from and/or write data to one or more storage resources 216 disposed in storage enclosures 211. In certain embodiments, host 202 may be a server. In another embodiment, host 202 may be a personal computer (e.g., a desktop computer or a portable computer). As depicted in FIG. 2, host 202 may include a processor 203, a memory 204 communicatively coupled to processor 203, and a network interface 206 communicatively coupled to processor 203. Although system 200 is depicted as having one host 202, it is understood that system 200 may include any number of hosts 202.

Processor 203 may include any system, device, or apparatus configured to interpret and/or execute program instructions and/or process data, and may include, without limitation a microprocessor, microcontroller, digital signal processor (DSP), application specific integrated circuit (ASIC), or any other digital or analog circuitry configured to interpret and/or execute program instructions and/or process data. In some embodiments, processor 203 may interpret and/or execute program instructions and/or process data stored in memory 204, storage array 210 and/or another component of system 200.

Memory 204 may be communicatively coupled to processor 203 and may include any system, device, or apparatus configured to retain program instructions and/or data for a period of time (e.g., computer-readable media). Memory 204 may include random access memory (RAM), electrically erasable programmable read-only memory (EEPROM), a PCMCIA card, flash memory, magnetic storage, opto-magnetic storage, or any suitable selection and/or array of volatile or non-volatile memory that retains data after power to host 202 is turned off.

Network interface 206 may include any suitable system, apparatus, or device operable to serve as an interface between host 202 and network 208. Network interface 206 may enable host 202 to communicate over network 208 using any suitable transmission protocol and/or standard, including without limitation all transmission protocols and/or standards enumerated below with respect to the discussion of network 208.

Network 208 may be a network and/or fabric configured to couple host 202 to storage resources 216 disposed in storage enclosures 211. In certain embodiments, network 208 may allow host 202 to connect to storage resources 216 disposed in storage enclosures 211 such that the storage resources 216 appear to host 202 as locally attached storage resources. In the same or alternative embodiments, network 208 may include a communication infrastructure, which provides physical connections, and a management layer, which organizes the physical connections, storage resources 216 of storage enclosures 211, and host 202. In the same or alternative embodiments, network 208 may allow block I/O services and/or file access services to storage resources 216 disposed in storage enclosures 211. Network 208 may be implemented as, or may be a part of, a storage area network (SAN), personal area network (PAN), local area network (LAN), a metropolitan area network (MAN), a wide area network (WAN), a wireless local area network (WLAN), a virtual private network (VPN), an intranet, the Internet, or any other appropriate architecture or system that facilitates the communication of signals, data, and/or messages (generally referred to as data). Network 208 may transmit data using any storage and/or communication protocol, including without limitation, Fibre Channel, Frame Relay, Asynchronous Transfer Mode (ATM), Internet protocol (IP), other packet-based protocol, small computer system interface (SCSI), advanced technology attachment (ATA), serial ATA (SATA), advanced technology attachment packet interface (ATAPI), serial storage architecture (SSA), integrated drive electronics (IDE), and/or any combination thereof. Network 208 and its various components may be implemented using hardware, software, or any combination thereof.

As depicted in FIG. 2, storage enclosure 211 may be configured to hold and power one or more storage resources 216, and may be communicatively coupled to host 202 and/or network 208, in order to facilitate communication of data between host 202 and storage resources 216. Storage resources 216 may include hard disk drives, magnetic tape libraries, optical disk drives, magneto-optical disk drives, compact disk drives, compact disk arrays, disk array controllers, and/or any other system, apparatus or device operable to store data. In certain embodiments, one or more of storage resources 216 may include a full-disk encryption (FDE) enabled storage resource.

Although the embodiment shown in FIG. 2 depicts system 200 having two storage enclosures 211, storage array 210 may have any number of storage enclosures 211. In addition, although the embodiment shown in FIG. 2 depicts each storage enclosure 211 having six storage resources 216, each storage enclosure 211 of network 200 may have any number of storage resources 216.

Although FIG. 2 depicts host 202 communicatively coupled to storage array 210 via network 208, one or more hosts 202 may be communicatively coupled to one or more storage enclosures 211 without network 208 or other network. For example, in certain embodiments, one or more storage enclosures 211 may be directly coupled and/or locally attached to one or more hosts 202. Further, although storage resources 216 are depicted as being disposed within storage enclosures 211, system 200 may include storage resources 216 that are communicatively coupled to host 202 and/or network 208, but are not disposed within a storage enclosure 211 (e.g., storage resources 216 may include one or more standalone disk drives).

In operation, one or more storage resources 216 may appear to an operating system executing on host 202 as a single logical storage unit or virtual resource 212. For example, as depicted in FIG. 2, virtual resource 212a may comprise storage resources 216a, 216b, and 216c. Thus, host 202 may "see" virtual resource 212a instead of seeing each individual storage resource 216a, 216b, and 216c. Although in the embodiment depicted in FIG. 2 each virtual resource 212 is shown as including three storage resources 216, a virtual resource 212 may comprise any number of storage resources. In addition, although each virtual resource 212 is depicted as including only storage resources 216 disposed in the same storage enclosure 211, a virtual resource 212 may include storage resources 216 disposed in different storage enclosures 211.

Figure 3:
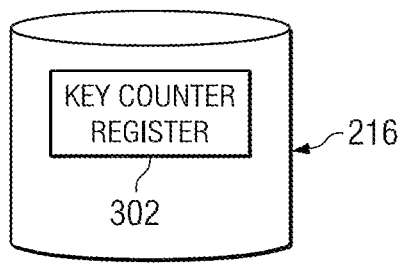
FIG. 3 illustrates an FDE-enabled storage resource, in accordance with the teachings of the present disclosure.

FIG. 3 illustrates an FDE-enabled storage resource 216, in accordance with the teachings of the present disclosure. As depicted, one or more of storage resources 216 may include a key counter register 302. As described in greater detail below, key counter register 302 may include a non-volatile memory and/or data store configured to store a counter value.

Figure 4:
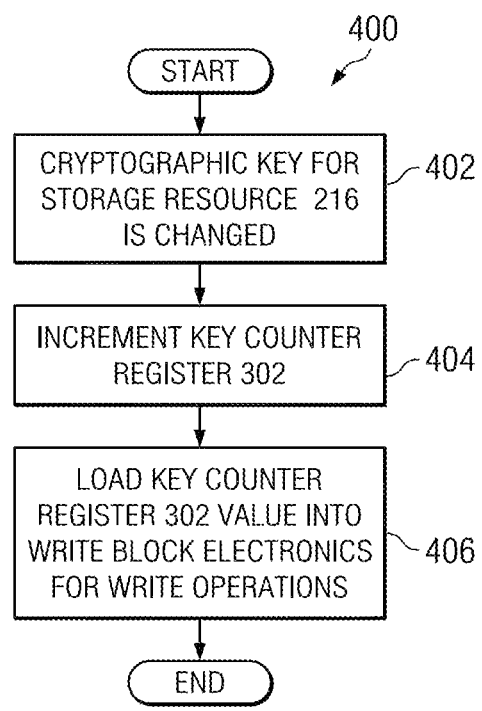
FIG. 4 illustrates a block diagram of an example method for incrementing a key counter register in connection with a key change of a storage resource, in accordance with certain embodiments of the present disclosure.

FIG. 4 illustrates a block diagram of an example method 400 for incrementing key counter register 302 in connection with a key change of a storage resource 216, in accordance with certain embodiments of the present disclosure. According to one embodiment, method 400 preferably begins at step 402. As noted above, teachings of the present disclosure may be implemented in a variety of configurations of system 200. As such, the preferred initialization point for method 400 and the order of the steps 402-406 comprising method 400 may depend on the implementation chosen.

At step 402, an encryption key for storage resource 216 may be changed. For example, the encryption key may be changed (e.g., by a user of the storage resource 216 and/or automatically by the storage resource 216 itself) in connection with a cryptographic erase of the storage resource 216.

At step 404, in response to the encryption key change, the value of key counter register 302 may be incremented by the storage resource 216. In certain embodiments, the value of key counter register may be incremented by a value of one.

Figure 5:
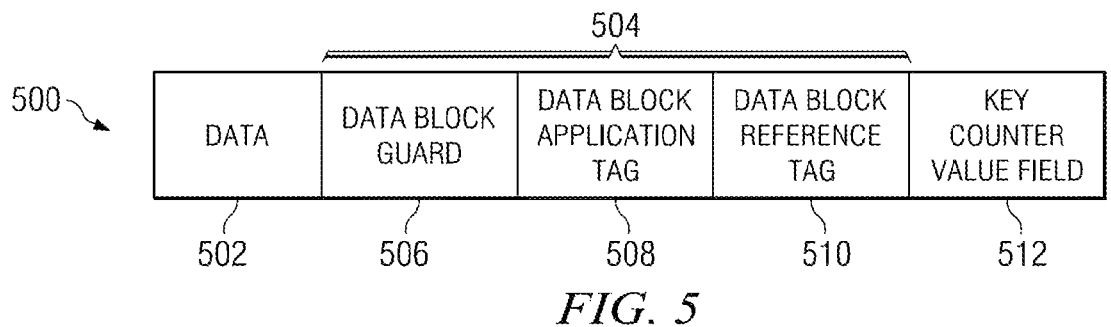
FIG. 5 illustrates a block diagram of an example data block having a data integrity field and a key counter value field, in accordance with certain embodiments of the present disclosure.

At step 406, storage resource 216 may load the value of key counter register 302 into write block registers or other electronics associated with the storage resource 216. Accordingly, a data block written to the storage resource may be appended with the value of the key counter register 302, as shown in FIG. 5 below. After completion of step 406, method 400 may end.

Although FIG. 4 discloses a particular number of steps to be taken with respect to method 400, method 400 may be executed with greater or lesser steps than those depicted in FIG. 4. In addition, although FIG. 4 discloses a certain order of steps to be taken with respect to method 400, the steps comprising method 400 may be completed in any suitable order.

Method 400 may be implemented using system 200 or any other system operable to implement method 400. In certain embodiments, method 400 may be implemented partially or fully in software and/or firmware embodied in computer-readable media.

FIG. 5 illustrates a block diagram of an example data block 500 having a data integrity field 504 and a key counter value field 512, in accordance with certain embodiments of the present disclosure. As shown in FIG. 5, data block 500 written to a storage resource 216 may include data 502, a data integrity field (DIF) 504, and a key counter value field 512. Data 502 may include data to be written to a storage resource 216, for example, in connection with a WRITE command.

DIF 504 may include one or more subfields, such as, for example, a data block guard 506, a data block application tag 508, and a data block reference tag 510. Data block guard 506 may include an error-detecting code based at least in part on the value of data 502, e.g., a cyclic redundancy check (CRC). Data block application tag 508 may include metadata indicative of the particular application to which the written data is associated. Data block reference tag 510 may include information associated with a specific data block within some context, for example the least-significant two or four bytes of the logical block address (LBA) of the write command associated with data 502. Accordingly, when a storage resource 216 receives a read request for data block 500, a controller associated with the storage resource 216 may check data block 502 against the stored DIF 504 to ensure that the data returned as part of the read request is valid (e.g., the data block guard 506 does not indicate corrupted data and that the data is associated with the LBA referenced in the read command). If the DIF 504 indicates an integrity error, a controller associated with the storage resource 216 may return an error message, indicating a data integrity error.

Key counter value field 512 may store a variable indicating the value of key counter register 302 at the time data block 502 was written to a particular storage resource 216. In accordance with the present disclosure, when a data block 500 is written to an FDE-enabled storage resource 216, the key counter value field 512 may be populated with the present value of the key counter register 302 associated with the storage resource. In certain embodiments, data 502 and DIF field 504 may be encrypted, while key counter value field 512 is not encrypted.

Figure 6:
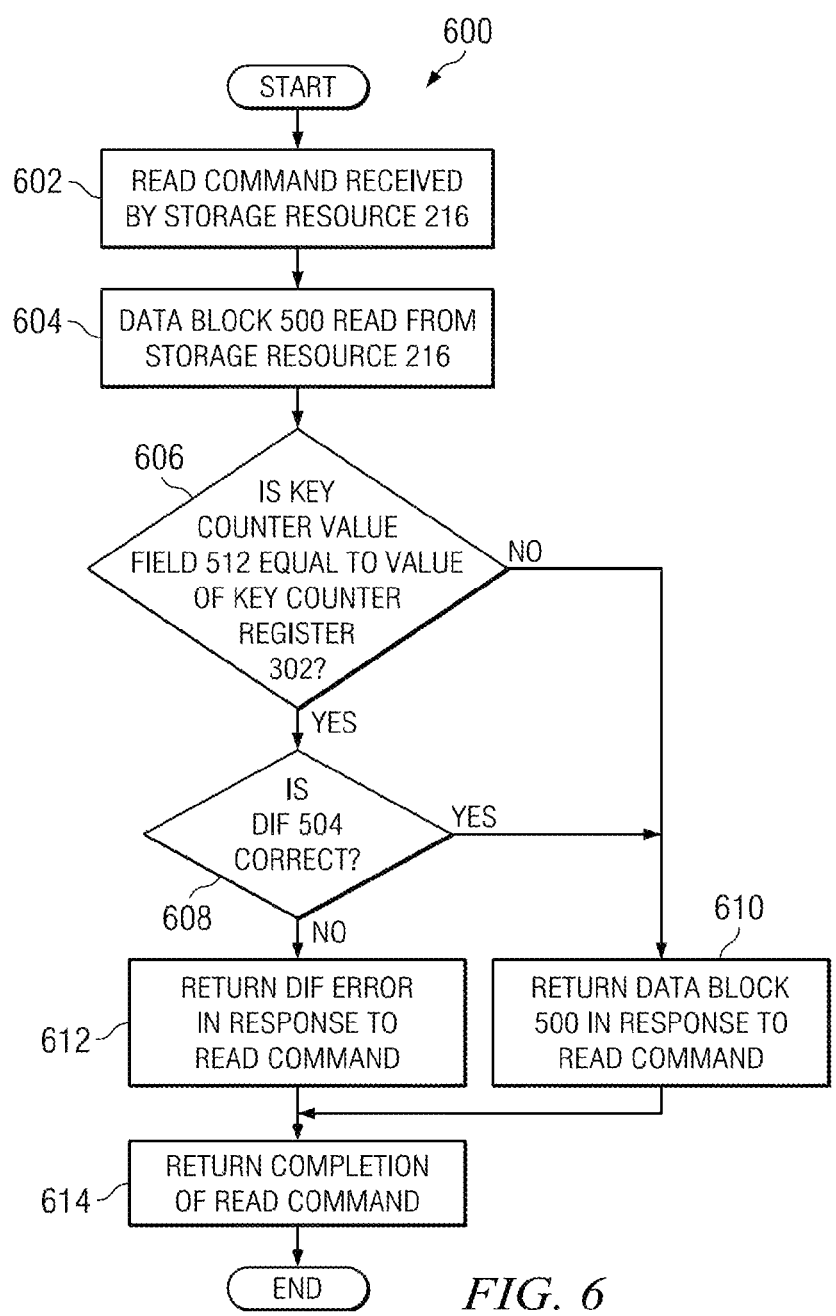
FIG. 6 illustrates a block diagram of an example method for performing a read command, in accordance with certain embodiments of the present disclosure.

FIG. 6 illustrates a block diagram of an example method 600 for performing a read command, in accordance with certain embodiments of the present disclosure. According to one embodiment, method 600 preferably begins at step 602. As noted above, teachings of the present disclosure may be implemented in a variety of configurations of system 200. As such, the preferred initialization point for method 600 and the order of the steps 602-614 comprising method 600 may depend on the implementation chosen.

At step 602, a read command for a data block 500 may be received by storage resource 216. In certain embodiments, the received read command may be associated with an initialization of a storage array (e.g., a RAID array) of which storage resource 216 is an integral part. At step 604, data block 500 may be read from storage resource 216.

At step 606, storage resource 216 and/or other components of system 200 may determine whether key counter value field 512 of the read data block 500 is equal to the value stored in key counter register 302. A key counter value field 512 equal to the key counter register 302 indicates that data block 500 was encrypted with the present encryption key when the data block was previously written to storage resource 500. Accordingly, if key counter value field 512 is equal to the value stored in key counter register 302, then data block 500 has been encrypted with the current encryption key, and method 600 may proceed to step 608. On the other hand, if key counter value field 512 is not equal to the value stored in key counter register 302, meaning that data block 500 was encrypted with a previous encryption key, method 600 may proceed to step 610.

At step 608, in response to a determination that key counter value field 512 of the read data block 500 is equal to the value stored in key counter register 302, storage resource 216 and/or another component of system 200 may determine whether DIF 504 is correct (e.g., whether one or more subfields of DIF 504 indicates the integrity of data block 500). If DIF 504 is correct, method 600 may proceed to step 610. On the other hand, if DIF 504 is incorrect (e.g., DIF 504 indicates that data 502 is corrupt), method 600 may proceed to step 612.

At step 610, in response to a determination that key counter value field 512 of the read data block 500 is not equal to the value stored in key counter register 302 or in response to a determination that DIF 504 is correct, storage resource 216 may return data block 500 in response to the read command received at step 602. The return of data block 500 indicates either that: (a) data block 500 is not corrupted, or (b) data block 500 was encrypted with a previous encryption key and therefore, it cannot be determined whether DIF 502 indicates the presence of uncorrupted data. In certain embodiments, storage resource 216 may return a message or other indication in the event that data block 500 was encrypted with a previous encryption key (e.g., storage resource 216 may set a flag and/or may overwrite DIF 502 with a value indicating encryption by a previous encryption key).

At step 612, in response to a determination that DIF 504 is incorrect, storage resource 216 may return a DIF error in response to the read command, indicating corruption of data block 500.

At step 614, storage resource 216 may return a completion signal or other indication that the read command has completed. After step 614 is completed, method 600 may end.

Although FIG. 6 discloses a particular number of steps to be taken with respect to method 600, method 600 may be executed with greater or lesser steps than those depicted in FIG. 6. In addition, although FIG. 6 discloses a certain order of steps to be taken with respect to method 600, the steps comprising method 600 may be completed in any suitable order.

Method 600 may be implemented using system 200 or any other system operable to implement method 600. In certain embodiments, method 600 may be implemented partially or fully in software and/or firmware embodied in computer-readable media.

Using the methods and systems disclosed herein, problems associated with conventional approaches to ensuring data integrity in a FDE-enabled storage resource may be improved, reduced, or eliminated. For example, the methods and systems herein provide an additional data field stored along with each data block that allows a storage resource to identify if the data block is inconsistent with DIF due to a change in an encryption key or is due to an actual DIF error.

Although the present disclosure has been described in detail, it should be understood that various changes, substitutions, and alterations can be made hereto without departing from the spirit and the scope of the disclosure as defined by the appended claims.

What is claimed is:

1. A method comprising:
   receiving a read command at a storage resource, wherein the read command is received in connection with an initialization of a storage array;
   reading a data block from the storage resource, the data block comprising:
      a data field,
      a data integrity field, indicating the integrity of the data field, and
      a key counter value field indicating a cryptographic key used to encrypt the data field;
   comparing the key counter value field to a key counter register associated with the storage resource, wherein the key counter register is modified each time a cryptographic key of the storage resource is modified, the modified cryptographic key is to be used to encrypt the data field when the data block is to be written to the storage resource;
   returning at least a portion of the data field if the key counter value field does not equal the key counter register;
   determining whether the data field is corrupted based on the data integrity field, if the key counter value field equals the key counter register; and
   returning an error indication if the data field is corrupted.

2. The method of claim 1, further comprising returning at least a portion of the data field in reply to the read command if the data field is not corrupted.

3. The method of claim 1, further comprising returning an indication that the data field was encrypted with a previous cryptographic key if the key counter value does not equal the key counter register.

4. The method of claim 1, wherein the storage resource comprises a full-disk encryption storage resource.

5. The method of claim 1, further comprising returning an indication that the read command has completed.

6. A storage resource comprising:
   a cryptographic key;
   a key counter register; and
   a non-transitory computer-readable storage medium;
   the storage resource configured to:
      receive a read command at a storage resource, wherein the read command is received in connection with an initialization of a storage array;
      read a data block from the storage medium, the data block comprising:
         a data field,
         a data integrity field, indicating the integrity of the data field, and
         a key counter value field indicating a cryptographic key used to encrypt the data field;
      compare the key counter value field to the key counter register, wherein the key counter register is modified each time the cryptographic key is modified, the modified cryptographic key is to be used to encrypt the data field when the data block is to be written to the storage resource;
      return at least a portion of the data field if the key counter value field does not equal the key counter register;
      determine whether the data field is corrupted based on the data integrity field, if the key counter value field equals the key counter register; and
      return an error indication if the data field is corrupted.

7. The storage resource of claim 6, further configured to return at least a portion of the data field in reply to the read command if the data field is not corrupted.

8. The storage resource of claim 6, further configured to return an indication that the data field was encrypted with a previous cryptographic key if the key counter value does not equal the key counter register.

9. The storage resource of claim 6, wherein the storage resource comprises a full-disk encryption storage resource.

10. The storage resource of claim 6, further configured to return an indication that the read command has completed.

* * * * *